United States Patent
Weber et al.

(10) Patent No.: US 7,127,177 B1
(45) Date of Patent: Oct. 24, 2006

(54) INTEGRATED POST-AMPLIFIER AND LASER DRIVER ASSEMBLY WITH DIGITAL CONTROL INTERFACE

(75) Inventors: Andreas Weber, Los Altos, CA (US); Giorgio Giaretta, Mountain View, CA (US); Dan Case, Gilroy, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/282,605

(22) Filed: Oct. 29, 2002

Related U.S. Application Data (60) Provisional application No. 60/400,965, filed on Aug. 2, 2002.

(51) Int. Cl.
  *H04B 10/00* (2006.01)
(52) U.S. Cl. ...................................... 398/137; 398/138
(58) Field of Classification Search ........ 398/135–139, 398/206
See application file for complete search history.

(56) References Cited

U.S. PATENT DOCUMENTS

| | | | |
|---|---|---|---|
| 4,916,705 A | 4/1990 | Glance | |
| 5,019,769 A * | 5/1991 | Levinson | 372/31 |
| 5,383,208 A * | 1/1995 | Queniat et al. | 372/29.014 |
| 5,442,321 A | 8/1995 | Bayruns et al. | |
| 5,479,288 A | 12/1995 | Ishizuka et al. | |
| 5,502,785 A | 3/1996 | Wang et al. | 385/92 |
| 5,537,093 A | 7/1996 | Aunon et al. | |
| 5,734,300 A | 3/1998 | Yoder | |
| 5,861,908 A | 1/1999 | Tonosaki et al. | |
| 5,878,015 A | 3/1999 | Schell et al. | |
| 5,933,264 A | 8/1999 | Van Der Heijden | |
| 5,956,168 A | 9/1999 | Levinson et al. | |
| 5,978,393 A * | 11/1999 | Feldman et al. | 372/31 |
| 6,130,562 A | 10/2000 | Bosch et al. | |
| 6,333,804 B1 | 12/2001 | Nishiyama et al. | |
| 6,400,857 B1 | 6/2002 | Hatami-Hanza et al. | 385/14 |
| 6,414,974 B1 | 7/2002 | Russell et al. | |
| 2002/0071164 A1 | 6/2002 | Lauge et al. | |

* cited by examiner

*Primary Examiner*—Agustin Bello
(74) *Attorney, Agent, or Firm*—Workman Nydegger (57) ABSTRACT

An integrated post-amplifier and laser driver assembly is provided that is implemented as a single integrated circuit and includes a plurality of amplifiers or other control devices or circuits configured to implement various effects concerning data signals received and/or transmitted by a transceiver in conjunction with which the integrated post-amplifier and laser driver assembly is employed. A digital control interface is included in the integrated post-amplifier and laser driver assembly and is configured to receive a control signal from an external digital controller. A glue logic module, and associated digital to analog controllers, of the integrated post-amplifier and laser driver assembly parse the control signal and generate and transmit corresponding analog signals to one or more of the amplifiers so as to implement processing of a data signal received from the optical receiver, as well as the control of data transmission by way of a suitable transmitter.

29 Claims, 4 Drawing Sheets

FIG. 4

INTEGRATED POST-AMPLIFIER AND LASER DRIVER ASSEMBLY WITH DIGITAL CONTROL INTERFACE

RELATED APPLICATIONS

This application claims the benefit of U.S. Provisional Patent Application Ser. No. 60/400,965, entitled "Integrated Post-Amplifier and Laser Driver Assembly with Digital Control Interface", filed Aug. 2, 2002.

BACKGROUND OF THE INVENTION

1. Field of the Invention

The present invention relates generally to high speed data transmission systems. More particularly, embodiments of the present invention relate to systems and devices that integrate post-amplifier and laser driver functionality with a digital control interface within a single integrated circuit, thereby resulting in reduced manufacturing costs as well as improvements in operational efficiency and functionality.

2. Related Technology

Many high speed data transmission networks rely on optical transceivers and similar devices for facilitating transmission and reception of digital data embodied in the form of optical signals. Typically, data transmission in such networks is implemented by way of an optical transmitter, such as a laser, while data reception is generally implemented by way of an optical receiver, an example of which is a photodiode.

Various other components are also employed by the optical transceiver to aid in the control of the optical transmit and receive components, as well as the processing of various data and other signals. For example, such optical transceivers typically include a driver configured to control the operation of the optical transmitter in response to various control inputs. The optical transceiver also generally includes an amplifier configured to perform various operations with respect to certain parameters of a data signal received by the optical receiver.

In conventional optical transceivers, the driver and amplifier are implemented by way of separate integrated circuits ("IC") that are placed on a printed circuit board ("PCB") and electrically connected with each other and with the optical transmitter and receiver. One drawback to such an approach however, is that the two separate ICs take up a relatively large amount of space on the PCB, often necessitating the use of a two-sided PCB. This type of approach is problematic however, at least because such two-sided PCBs are generally more expensive and more difficult to manufacture than a single-sided PCB.

Another concern with conventional optical transceivers relates to the control circuit interface typically employed. Generally, the control circuit serves to direct both the processing of various data signals, as well as certain operational aspects of the optical transmitter and receiver. In conventional optical transceivers, the driver and post-amplifier communicate with the control circuit by way of corresponding analog interfaces. One problem with such an arrangement is that the need for multiple interfaces necessarily requires additional PCB space and complicates the manufacturing process.

As suggested by the foregoing, the implementation of post-amplifier and driver functionality in the form of discrete components gives rise to some redundancy in terms of the various components that are required. In addition to necessitating, for example, multiple interfaces, such arrangements also typically require respective sets of registers and monitoring circuits for the post-amplifier and for the laser driver. As in the case of the interfaces, these additional components take up additional space on the PCB and increase manufacturing costs and complexity.

With more particular reference to the analog interfaces between the control circuit and the post-amplifier and laser driver, it was suggested earlier that implementation of such analog interfaces requires the control circuit to communicate with the optical transceivers by way of analog signals. However, the use of such analog signals, at least where such use is required by the employment of analog interfaces, may limit the functionality of the control circuit and/or the optical transceiver.

In view of the foregoing, it would be useful to be able to integrate the post-amplifier and laser driver in such a way that their respective functionalities could be implemented in a single-sided PCB, while at the same time minimizing redundant components and functionality. Moreover, the integrated post-amplifier and laser driver should include a single digital control interface that will serve to enhance the flexibility and functionality of the optical transceiver, and related devices, by providing the ability to receive and process multiplexed digital control signals that include data pertaining to a variety of signal control parameters. Finally, the integrated post-amplifier and laser driver should implement suitable digital-to-analog converters ("DAC") which will allow conversion of digital control signals to an analog form that that can be used in the processing of various data signals, as well as in the control of certain operational aspects of the optical transmitter and optical receiver.

BRIEF SUMMARY OF AN EXEMPLARY EMBODIMENT OF THE INVENTION

In general, embodiments of the invention are concerned with high speed data transmission systems and devices that are useful in integrating post-amplifier and laser driver functionality within a single integrated circuit ("IC"), thereby resulting in reduced manufacturing costs as well as improvements in operational efficiency and functionality.

In one exemplary embodiment of the invention, an integrated post-amplifier and laser driver assembly ("PA/LD") suitable for use in a high speed communications system is provided that is configured to interface with an optical receiver and optical transmitter. The PA/LD is configured as a single IC and includes a digital control interface for communication with an external digital IC controller. The digital control interface, in turn, is arranged for communication with various registers and associated logic of the PA/LD that generally serve to implement the parsing and storage of instructions received from the digital IC controller.

The registers communicate with various circuits, at least some of which are exemplarily embodied as amplifiers, within the PA/LD by way of one or more DACs so that when it is desired to implement, by way of one or more of the circuits, various actions pertaining to instructions received from the digital IC controller, such instructions can be retrieved and converted to an analog form suitable to facilitate implementation of various actions by the appropriate circuits. In this exemplary embodiment, such actions relate to the processing of a data signal received from the optical receiver, and to the control of data transmission by way of an optical transmitter.

Finally, this exemplary embodiment of the PA/LD also includes a power supply circuit. In general, the power supply circuit is configured to control the flow of power to the optical transmitter in accordance with various predefined criteria.

With reference first to the operation of the laser driver of the PA/LD, certain user-specified parameter values and/or various instructions, typically in the form of a multiplexed digital control signal, are transmitted from the digital IC controller to the laser driver by way of the digital control interface. Such values and instructions may include, for example, a desired transition time and modulation amplitude for the optical transmitter signal. These values and instructions are then parsed and stored in appropriate registers within the PA/LD.

At such time as one or more of the values, such as the modulation amplitude of the data signal to be transmitted to the optical transmitter, is desired to be employed, the portion of the control signal representing that value is converted to analog form by a corresponding DAC and then routed to the appropriate circuit of the laser driver. The circuit then generates, and transmits to the optical transmitter, a modified data signal having the desired modulation amplitude.

The operation of the post-amplifier of the PA/LD is similar in many regards. In particular, certain values and instructions relating to the processing of a data signal received by the post-amplifier from an optical receiver are received from the digital IC controller by way of the digital control interface and stored in the corresponding registers of the integrated post-amplifier and laser driver assembly. In this exemplary embodiment, such values and instructions may include, for example, a desired transition time and modulation amplitude for the data signal received from the optical receiver, as well as instructions concerning the conditions under which the post-amplifier should generate and transmit a loss of signal ("LOS") signal. In this exemplary case, the amplifier changes the transition time and amplitude of the incoming signal to match given set points. These changes are implemented without any feedback, or in "open loop" manner. The amplifier then generates and transmits a modified data signal having the desired transition time and amplitude.

These and other, aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF SELECTED EMBODIMENTS OF THE INVENTION

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

A. Aspects of Exemplary PA/LD Implementations

It should be noted that while some embodiments of the invention are well-suited for use in conjunction with a high speed data transmission system conforming to the Gigabit Ethernet ("GigE") physical specification, such operating environment is exemplary only and embodiments of the invention may, more generally, be employed in any of a variety of high speed data transmission systems, some of which may have line rates up to, or exceeding, 2.5 Gbit. For example, some embodiments of the invention are compatible with the Fibre Channel ("FC") physical specification.

Further, embodiments of the invention may be implemented in various ways. By way of example, some embodiments of the PA/LD are implemented in Small Form Factor Pluggable ("SFP") bi-directional transceiver modules. As suggested above, such transceiver modules are configured for GigE and/or FC compliance. Exemplarily, such transceiver modules are capable of transmitting and/or receiving at a wavelength of about 850 nm. Moreover, these transceiver modules can operate over a wide range of temperatures. For example, some of such transceiver modules are effective over a temperature range of about 80° C., such as from about −10° C. to about +70° C. Of course, such embodiments and associated operating parameters are exemplary only, and are not intended to limit the scope of the invention in any way.

B. Aspects of Exemplary PA/LD Architecture

Figure 1:
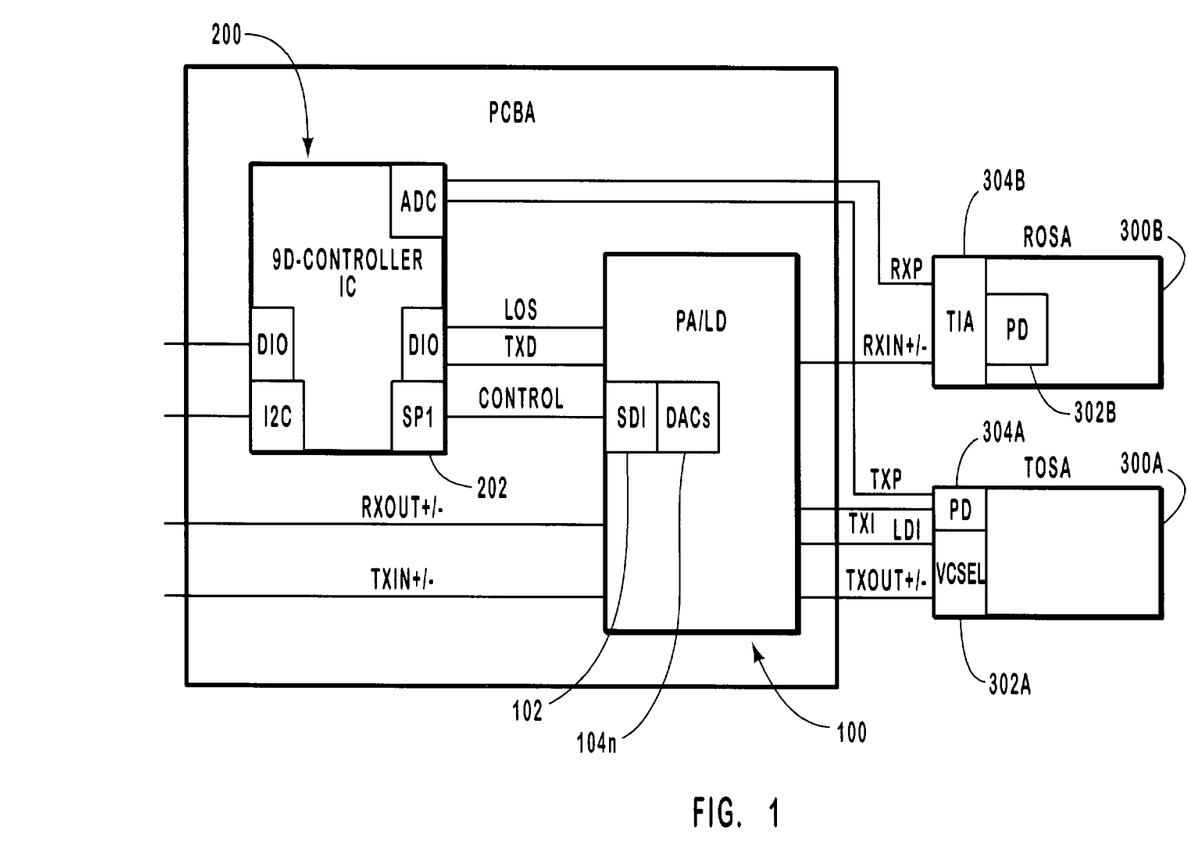
FIG. 1 is a block diagram that illustrates various aspects of an exemplary operating environment for embodiments of the present invention.

With reference first to FIG. 1, details are provided concerning various aspects of the general architecture of an exemplary embodiment of an integrated post-amplifier and laser driver ("PA/LD") assembly 100. Generally, the PA/LD 100 is configured for communication with a digital IC controller 200, as well as with a 'transmit' optical subassembly ("TOSA") 300A and a 'receive' optical subassembly ("ROSA") 300B.

Among other things, the PA/LD 100 comprises a digital control interface 102 connected with glue logic module 103 that, in turn, is configured for communication with one or more digital-to-analog converters ("DAC") 104n. Exemplarily, the digital control interface comprises a serial digital interface. Embodiments of a digital control interface are disclosed and claimed in co-pending U.S. patent application Ser. No. 10/282,669 entitled DIGITAL CONTROL INTERFACE TO POST-AMPLIFER AND LASER DRIVER, filed the same day herewith, and incorporated herein in its entirety by this reference.

One useful aspect of such a digital control interface is that it enables the use of multiple control parameters that can be readily multiplexed into one, or a relatively small number of, digital control signals. Thus, the digital control interface permits a relative increase in the number of PA/LD 100 operations that can be controlled, without necessitating a corresponding increase in components or circuitry and, by virtue of the use of digital control signals, the digital control interface also contributes to a relative decrease in the number of the control signals that are required to control PA/LD 100 operations.

With respect to the foregoing, an internal serial bus arrangement may alternatively be employed to implement some or all of the functionality disclosed herein. Embodiments of such a serial bus arrangement are disclosed and claimed in co-pending U.S. patent application Ser. No. 10/266,870 entitled OPTICAL TRANSCEIVER MODULE WITH MULTIPURPOSE INTERNAL SERIAL BUS, filed Oct. 8, 2002, and incorporated herein in its entirety by this reference.

It should be noted here that the PA/LD 100 may be referred to herein as comprising a 'post-amplifier' or 'post-amplifier assembly,' and a 'laser driver' or 'laser driver assembly,' exemplary embodiments of which may comprise one or more amplifiers or other control devices intended to implement certain effects with respect to signals transmitted and/or received by the PA/LD 100. In yet other instances, no distinction between the post-amplifier and laser driver is made, and the PA/LD 100 may simply be referred to as comprising various control, and other, devices intended to implement certain effects with respect to signals transmitted and/or received by the PA/LD 100.

In general however, the devices and/or systems that are concerned with implementation of functionality that relates primarily to a data signal received by the PA/LD 100 are typically referred to as a 'post amplifier' or 'post amplifier assembly.' On the other hand, devices and/or systems that are concerned with implementation of functionality that relates primarily to control, by the PA/LD 100, of the transmission of a data signal are typically referred to as a 'laser driver or 'laser driver assembly.' Nonetheless, a device or system that comprises a portion of the 'post amplifier' in one embodiment, may comprise a portion of the 'laser driver' in another embodiment. Accordingly, the foregoing distinctions are not intended to, nor should be construed to, limit the scope of the invention in any way.

In general, the functionality of the integrated post-amplifier and laser driver assembly 100 is typically implemented as a single IC on a single-sided PCB. In some instances, the PA/LD is implemented as a non-hermetic plastic packaged IC with lead frame. However, other types of IC packages, such as ceramic packages, may alternatively be employed, consistent with the requirements of a particular application or operating environment.

One useful aspect of the single IC configuration is that it minimizes the number of external devices that are required, as some or all of the external devices can be incorporated within the IC. By way of example, at least some embodiments of the invention obviate the need for external passive devices that perform functions such as, but not limited to, set point, matching, filter, and A/C coupling. A related aspect of the single IC configuration is that it generally eliminates the need for connectors, such as flex connectors, between the post-amplifier and laser driver. Further, the single IC package can be incorporated into a relatively small size, as small as 4 mm×4 mm in some cases.

In the illustrated embodiment, the TOSA 300A exemplarily comprises a vertical cavity surface emitting laser ("VCSEL") 302A in communication with a photodiode 304A. In at least some embodiments, the VCSEL comprises a non-hermetic lead frame plastic package. One aspect of VCSELs that makes them desirable in at least some applications is their relatively low cost. Of course, other types of optical transmitters may also be employed. In general, any light transmission source, and transmission wavelength, that is compatible with PA/LD 100 may be used.

Similarly, ROSA 300B exemplarily comprises a PIN photodiode 302B in communication with a transimpedance amplifier ("TIA") 304B and, in this embodiment at least, requires no capacitors for its operation. Moreover, in at least some embodiments, the ROSA is implemented as a non-hermetic lead frame plastic package. As in the case of the TOSA 300A however, other embodiments of ROSA 300B may alternatively be employed.

In some embodiments, one or both of the TOSA 300A and ROSA 300B further include systems and/or devices to aid in evaluation and diagnostic evolutions concerning their performance and/or the performance of related components and systems. By way of example, the TOSA 300A and/or ROSA 300B in such embodiments includes a log amplifier for use in conjunction with a monitor photodiode, such as PIN photodiode 302B or photodiode 304A, and/or current mirror circuitry.

Another aspect of some embodiments of the TOSA 300A is that they provide for a DC active bias for laser modulation. This eliminates the need for bias T modulation devices and circuitry such as are typically employed in laser modulation applications.

With continuing reference now to aspects of the exemplary PA/LD illustrated in FIG. 1, exemplary embodiments of the PA/LD 100 are configured to transmit, receive, and/or process a variety of different signals. Such signals may comprise, among other things, data and monitoring signals, control signals, or may be concerned with the transmission of power to/from various components. In this exemplary embodiment, the data signals are digital and include those signals designated RXIN+/− and RXOUT+/− and which denote, respectively, a data signal received from ROSA 300B, and a data signal transmitted by the PA/LD 100 to a customer. Similarly, the signals designated TXIN+/− and TXOUT+/− denote, respectively, a data signal received by the PA/LD 100 from a customer, and a customer data signal transmitted to TOSA 300A. In any case, the +/− designation refers to the fact that, in at least some embodiments, the signal channel consists of two data transmission lines of opposite polarities. Thus, in this exemplary implementation, the signal designated TXIN+/− actually comprises a first line TXIN+ and a second line TXIN−.

With continuing reference to FIG. 1, PA/LD 100 is also configured to receive, via the digital control interface 202, various control signals pertaining to the operation of the TOSA 300A and/or to the processing of the RXIN+/− data signal received by PA/LD 100 from ROSA 300B. Such control signals can be tailored according to any of a variety of variables. For example, the temperature of VCSEL 302A may be used as a basis for modifications or adjustments to a control signal relating, for example, to a bias point for a circuit element of PA/LD 100. Examples of such control signals are considered in further detail below.

Yet another exemplary control signal transmitted from the digital IC controller 200 to the PA/LD 100 is the TXD signal. In general, the TXD signal directs the PA/LD 100 to shut down the TOSA 300B. Shutdown of the TOSA 300B may be implemented, for example, when it is desired to power down a module to facilitate performance of diagnostics, or when there is a fault indication such as an internal short or excessive transmit power. As indicated in FIG. 1, the TXD signal may, in at least some cases, be transmitted from the digital IC controller 200 to the PA/LD 100 other than by way of the respective digital control interfaces of those components. Note that the same is likewise true with respect to the LOS signal for example, as discussed below.

In addition to the various control signals generated and transmitted to the PA/LD 100 by the digital IC controller 200, signals generated by one of the optical devices may likewise be used to aid in the control of those devices and/or for other purposes. By way of example, in the embodiment of PA/LD 100 illustrated in FIGS. 1 and 2, the TOSA 300A generates the TXI signal and transmits the TXI signal to the PA/LD 100. In general, the TXI signal received at the PA/LD 100 from the TOSA 300A indicates the level of current at which the TOSA 300A is operating. In this exemplary embodiment, the TXI signal serves as an input to a power supply circuit of the PA/LD 100 that is used to control the input voltage to the VCSEL (FIG. 2), as discussed in further detail below.

Note that in some cases, the TXI signal may be used for purposes other than implementing a control functionality. By way of example, some exemplary embodiments use the TXI signal to implement a monitoring functionality with respect to the VCSEL 302 current. Details concerning one such exemplary embodiment are provided below in conjunction with the discussion of the TXP signal.

As suggested earlier, embodiments of the PA/LD 100 are also configured to transmit, receive, and/or process a variety of monitoring signals pertaining to the operation and/or status of various components. One example of a monitoring functionality implemented by way of the PA/LD 100 is indicated by the LOS signal. Generally, the LOS signal is generated and transmitted by the PA/LD 100 to the digital IC controller 200 when the incoming data signal RXIN+/− has been lost, or otherwise fails to comport with certain established criteria.

Other exemplary monitoring functionalities related to, but not necessarily implemented by this exemplary embodiment of, the PA/LD 100, include the TXP signal transmitted from the TOSA 300A to the digital IC controller 200 indicating the optical power of the TOSA 300A. More particularly, the TXP is an electrical signal that is proportional to the optical power in the VCSEL 302A. A similar monitoring signal is generated with respect to the operation of the ROSA 300B. In particular, the RXP signal transmitted from the ROSA 300B to the digital IC controller 200 indicates the optical power of the ROSA 300B. Exemplarily, the RXP signal comprises an electrical signal that is proportional to the optical power in the ROSA 300B photodiode 302B.

Some of the monitoring signals, such as the TXP signal for example, may be used for purposes other than implementing a monitoring functionality. By way of example, some exemplary embodiments use the TXP signal as an input to a power supply circuit that is used to control the power input to the TOSA 300A.

In connection with the foregoing discussion of exemplary aspects of the TXP and TXI signals, it should be noted that the functionality of the TXP and TXI signals and, more generally, other signals disclosed herein, may be interchanged in some cases if necessary to suit the requirements of a particular application.

Figure 2:
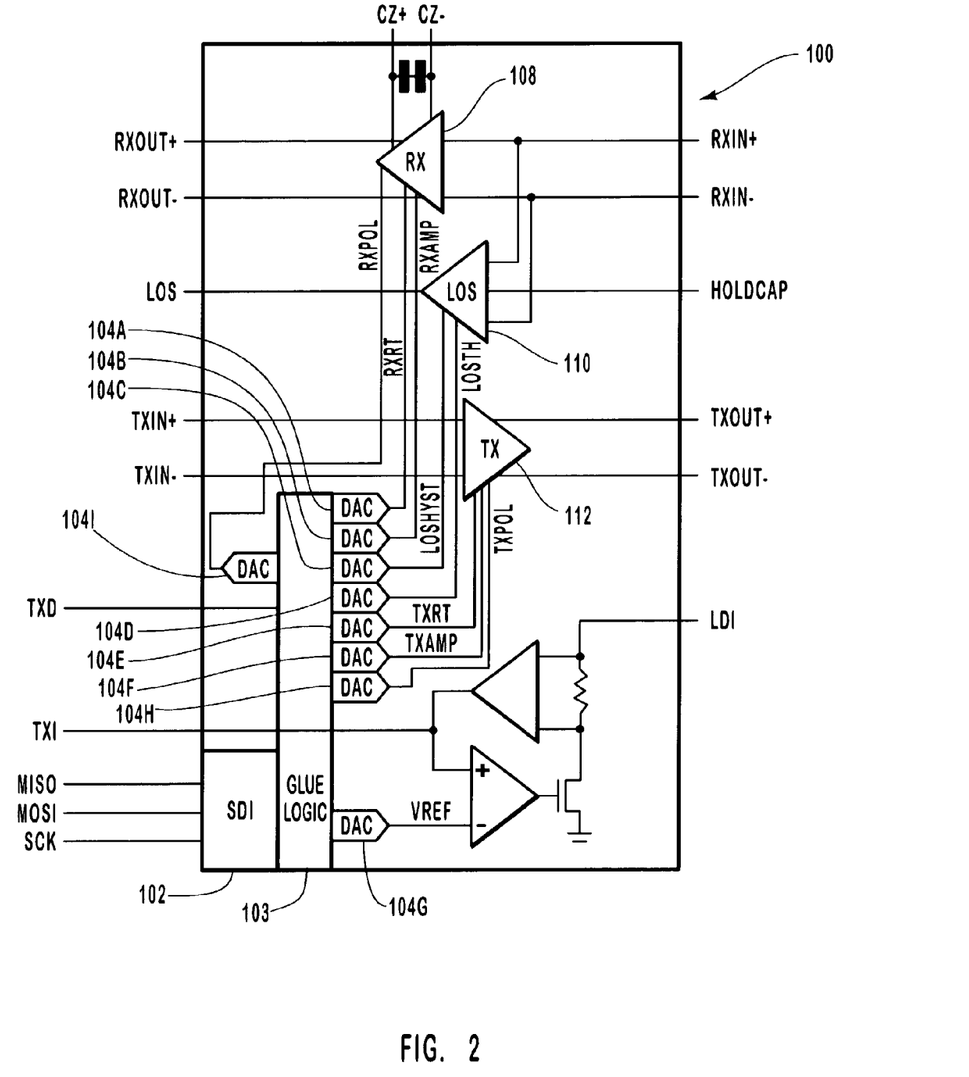
FIG. 2 is a schematic diagram that illustrates aspects of an exemplary embodiment of an integrated PA/LD that includes a digital control interface.

As noted earlier, the implementation of the PA/LD 100 illustrated in FIGS. 1 and 2 configured so that the TXP signal provides a monitoring functionality with respect to TOSA 300A performance, and the TXI signal serves as the input to a power supply circuit that controls the power to the TOSA 300A. Alternatively however, other implementations of the PA/LD 100 may be configured so that the TXI signal provides the monitoring functionality with respect to TOSA 300A performance, while the TXP signal serves as the input to the power supply circuit that controls the power to the TOSA 300A. In either case, the monitoring signal may be provided to internal and/or external users. In yet other implementations of the PA/LD 100, the signal that provides the monitoring functionality may be omitted altogether. Thus, the foregoing are exemplary implementations and are not intended to limit the scope of the invention in any way.

In addition to the signals that implement various monitoring and control functionalities, yet other signals employed in conjunction with the PA/LD 100 concern aspects of PA/LD 100 operations such as power transmission and control. By way of example, the LDI signal is the actual DC bias current that is applied to the TOSA 300A to power the VCSEL 302A. As another example, the reference voltage signal VREF is an input to a feedback system that controls the input voltage to the VCSEL.

Of course, the enumeration and combinations of the various data, monitoring, power, control, and other, signals disclosed herein are exemplary only and are not intended to limit the scope of the invention. Accordingly, other exemplary embodiments of PA/LD 100 may include, implement or embody additional or alternative functionalities, as necessary to suit the requirements of a particular system or application.

Directing attention now to FIG. 2, further details are provided concerning various aspects of the architecture of an exemplary embodiment of the PA/LD 100. As indicated there, the digital control interface 102 of this embodiment of the PA/LD 100 exemplarily comprises a three pin configuration adapted to receive master-in-slave-out ("MISO") and master-out-slave-in ("MOSI") control signals at 'data' and 'enable' pins, respectively, as well as a system clock ("SCK") signal, from the digital IC controller 200. While two and three pin serial interfaces are particularly useful in some embodiments of the invention, the serial interface may, more generally, be implemented as any industry standard, or customized, serial interface.

The digital control interface 102 communicates, in turn, with a plurality of DACs 104A through 104n by way of glue logic module 103. In the illustrated embodiment, nine DACs are provided, although the number may vary depending upon the requirements of a particular application or system. As discussed below, the DACs generally operate to convert a digital control signal into an analog signal that can be acted upon by the PA/LD 100. In this exemplary embodiment, some of the DACs comprise 8 bit DACs, but various other types of DACs may alternatively be employed.

As indicated in FIG. 2, the DACs in this exemplary embodiment are concerned with, respectively, the following signals: DAC 104A —RXRT (control transition time of RXIN+/−); DAC 104B —RXAMP (control amplitude of RXIN+/−); DAC 104C —LOSHYST (loss of signal hysteresis for RXIN+); DAC 104D —LOSTH (loss of signal threshold for RXIN−); DAC 104E —TXRT (control transition time of TXOUT+/−); DAC 104F —TXAMP (control amplitude of TXOUT+/−). In addition to the foregoing, a DAC 104G is provided that communicates with a power supply circuit 106 to control power input LDI to TOSA 300A by way of a reference voltage signal VREF. Further, DAC 104H and DAC 104I are provided that are generally concerned with, respectively, controlling the polarity of TXOUT+/− and RXOUT+/−.

With continuing reference to FIG. 2, various amplifiers, which exemplarily comprise radio frequency ("RF") amplifiers, are provided that communicate with respective DACs and generally act to implement certain actions specified by the control signal received by the PA/LD 100 from the digital IC controller 200. For example, the illustrated embodiment of PAILD 100 includes an RX amplifier 108 that receives analog input from DACs 104A, 104B and 104I and modifies RXIN+/−, in accordance with such inputs, to produce RXOUT+/−. In the illustrated embodiment, RX amplifier 108 is configured to modify the transition time, amplitude and polarity of RXIN+/−.

Further, the RX amplifier 108 is exemplarily configured with CZ+/− ports for use in bypassing a feedback network, such as may be used to bias the RX amplifier 108. In this exemplary arrangement, a large, external capacitor placed between the CZ+/− ports. In other embodiments however, such biasing is achieved without the need for the external capacitor, and hence the CZ+/− ports.

Additionally, an LOS circuit 110, exemplarily embodied as an amplifier, is provided that monitors RXIN+/− and transmits an LOS signal to the digital IC controller 200 when RXIN+/− exceeds, or falls below, a predefined threshold. Also, the LOS circuit 110 implements a hysteresis functionality to minimize or eliminate random switching of the LOS signal, usually caused by small variations in received signal strength or noise and often referred to as 'chatter,' that would likely otherwise result as RXIN+/− moves back and forth over the predefined threshold.

Finally, the illustrated embodiment of the PA/LD 100 includes a TX amplifier 112 that receives analog input from DACs 104E, 104F and 104H and modifies TXIN+/−, in accordance with such inputs, to produce TXOUT+/−. In the illustrated embodiment, the TX amplifier 112 is configured to modify the transition time, amplitude and polarity of TXIN+/−. In at some embodiments, the TX amplifier 112 may be implemented as a plurality of amplifiers, each of which is concerned with the control of one of the transition time, amplitude and polarity of the TXIN+/− signal. In yet other embodiments, the TX amplifier 112 may be implemented as a single multi-stage amplifier so that all of the aforementioned control functionalities concerning the TXIN+/− signal are implemented by a single component. Note that the foregoing discussion is equally germane to the RX amplifier 108.

It should be noted that the various types and combinations of amplifiers, as well as their respective functionalities, disclosed herein are exemplary only. Various other types of control systems and devices may alternatively employed. In connection with the foregoing, the combinations of functionalities implemented by way of PA/LD 100 are, likewise, exemplary only and are not intended to limit the scope of the invention in any way. Accordingly, additional or alternative functionalities, and combinations thereof, may also be implemented by PA/LD 100, as necessitated by the requirements of a particular system or application.

C. General Aspects of PA/LD Operations

Figure 3:
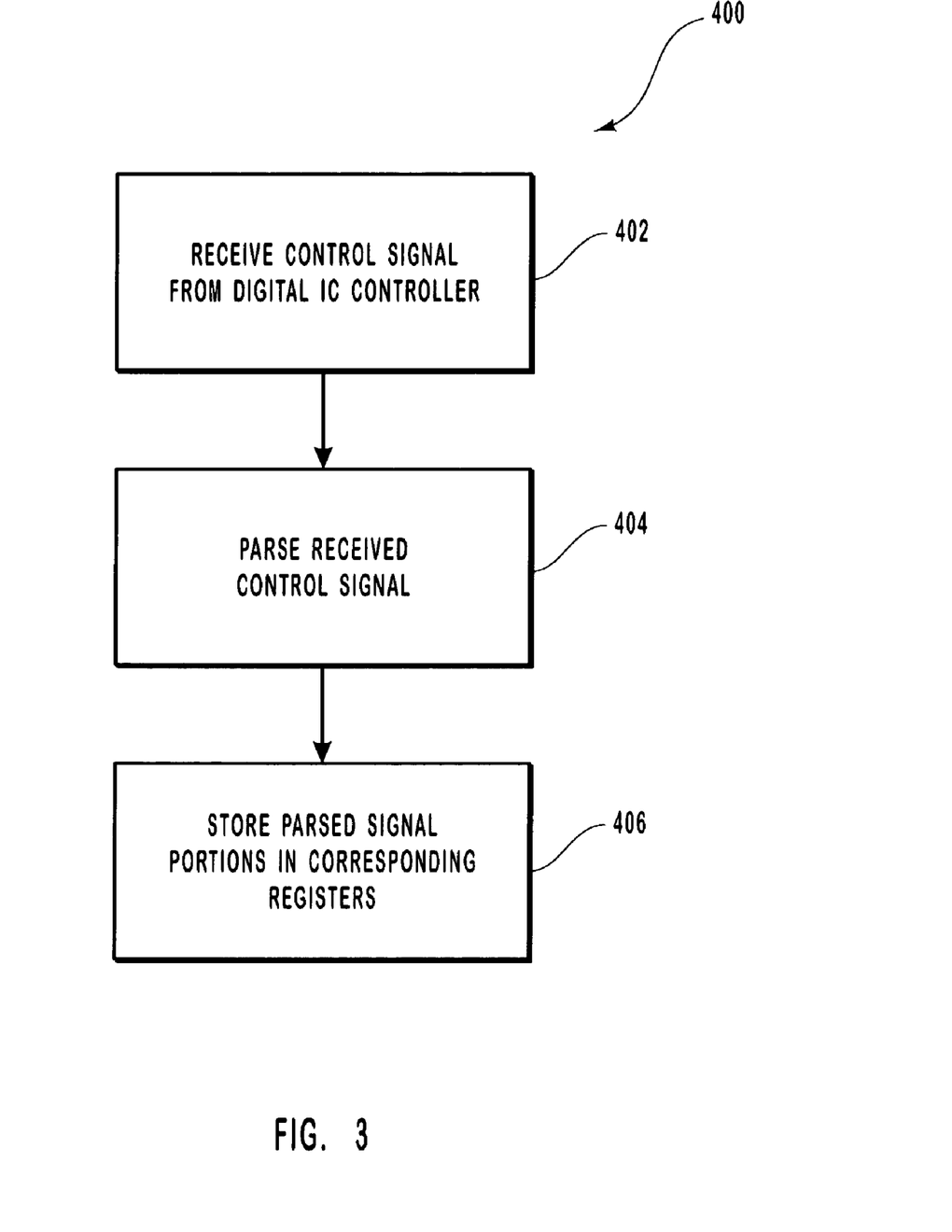
FIG. 3 is a flow diagram indicating aspects of an exemplary method for the processing of an incoming control signal, such as may be produced by a digital IC controller.
Figure 4:
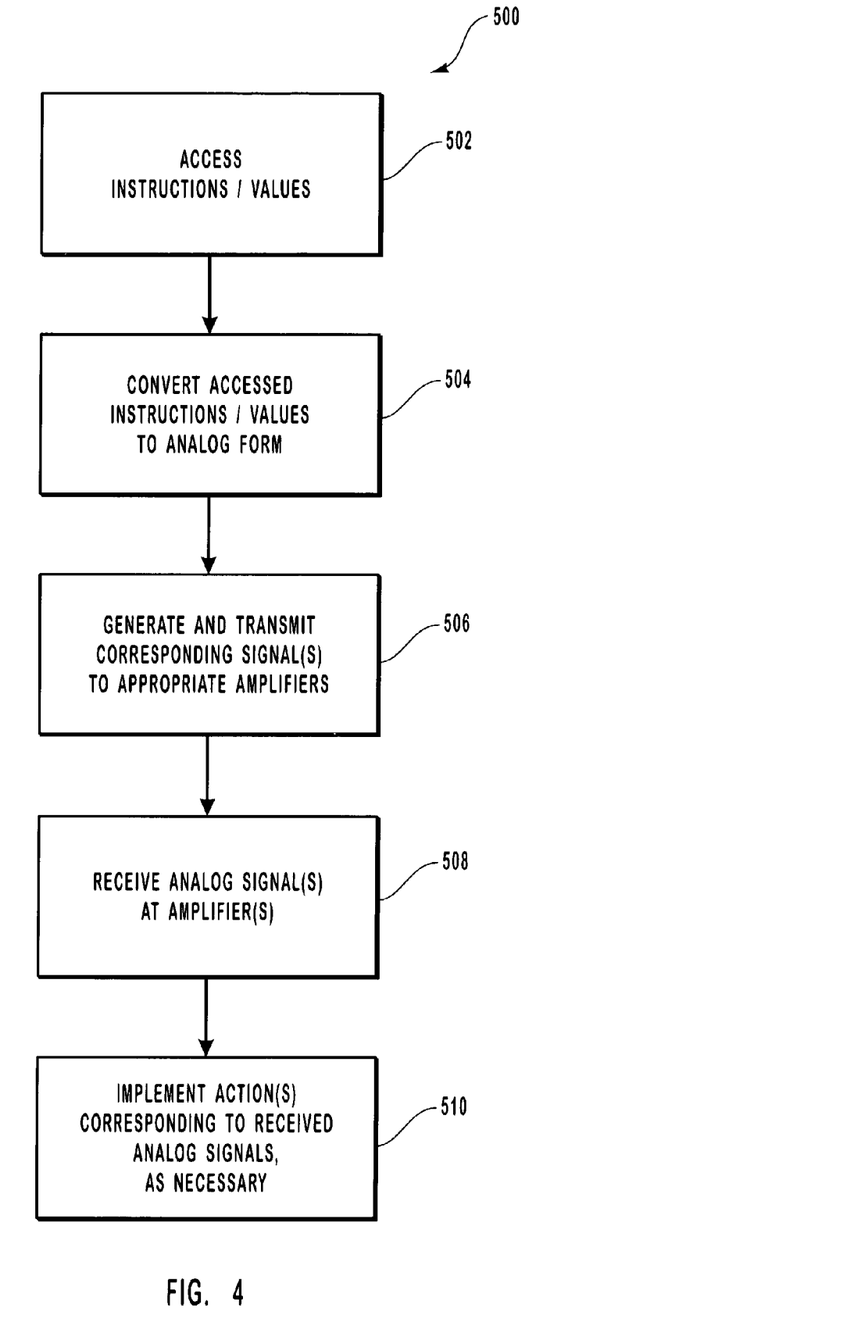
FIG. 4 is a flow diagram indicating general aspects of an exemplary method for using control signals and/or other signals to cause one or more control devices of the integrated PA/LD to perform various operations concerning a data signal received or transmitted by the integrated PA/LD.

With continuing attention to FIGS. 1 and 2, and directing attention now to FIGS. 3 and 4, details are provided now concerning certain operational aspects of the illustrated embodiment of PA/LD 100 and various related components. With attention first to FIG. 3, aspects of an exemplary method 400 for receiving and processing an incoming control signal are illustrated.

In particular, at state 402, the control signal initially transmitted from the digital IC controller 200 is received at the PA/LD 100. Exemplarily, such signals relate to, among other things, the processing of TXIN+/− and RXIN+/−, the operation of TOSA 300A, and the disablement of PA/LD 100. Some of the control signals transmitted by the digital IC controller 200 may be received at the digital control interface 102 of PA/LD 100, while other control signals transmitted by the digital IC controller 200, such as the TXD signal, are received directly at the 'glue logic' module 103. This arrangement is exemplary only however, and various alternative schemes for receipt of incoming control signals at the PA/LD 100 may be implemented.

In general, the control signals transmitted by the digital IC controller 200 and received at the PA/LD 100 comprise one or more digital words, comprised of a defined sequence of digital bits, which may constitute instructions and/or parameter values. When the control signal has been received at PA/LD 100, state 404 is entered wherein the glue logic module 103 parses the control signal and directs the digital words, or portions thereof, into the various discrete instructions and/or parameter values.

After parsing has been completed, state 406 is entered. At this state, the glue logic module 103 directs the parsed segments of the data signal to the appropriate registers within the glue logic module. Because each register corresponds with a particular DAC, the parsed segments of the data signal can thus be stored in a manner consistent with the way in which the particular segment is to be employed. By way of example, a parsed segment of the control signal that concerns the threshold for the LOS signal is stored in a DAC that is configured to communicate with the LOS circuit 110.

At such time as the incoming control signal has been parsed and registered, the PA/LD 100 then performs various actions based upon the parsed instructions and/or values. Thus, control information concerning a wide variety of PA/LD 100 operations can be transmitted by way of a single control signal. Moreover, the control signal requires only a single digital interface at the PA/LD 100. This arrangement considerably simplifies the physical implementation of the PA/LD 100, as well as the processing of the incoming control signal.

Directing attention now to FIG. 4, details are provided concerning aspects of an exemplary process 500 for implementing actions based upon one or more control signals. As discussed below, FIG. 4 depicts only certain general aspects of such an exemplary process, and reference to more particular implementations is made after aspects of the process illustrated in FIG. 4 have been addressed.

In general, state 502 is entered wherein the glue logic module 103 accesses and retrieves the instructions and/or values stored in the various registers. Next, state 504 is entered wherein the applicable DACs convert the accessed instructions and/or values from digital to analog form. After this conversion has been completed, state 506 is entered and the applicable DACs generate and transmit corresponding analog signals to the appropriate amplifiers. In state 508, the appropriate amplifiers receive the analog signals and then move to state 510 where various actions are implemented with regard to the signals with which such amplifiers are concerned.

D. Aspects of Exemplary PA/LD Operations—TX Amplifier & TOSA

With more particular reference now to the input customer data signal TXIN+/− (FIG. 2), DACs 104E, 104F and 104G, respectively, convert the words, or portions thereof, relating to the TXIN+/− transition time, TXIN+/− amplitude and TXIN+/− polarity, to an analog form and then transmit the analog signals TXRT, TXAMP and TXPOL, as/if applicable, to TX amplifier 112.

In response, the TX amplifier 112 then adjusts the transition time, amplitude and/or polarity of TXIN+/− consistent with the TXRT, TXAMP and TXPOL signals, respectively, as necessary, to convert signal TXIN+/− into a signal TXOUT+/− that is suitable for driving the VCSEL 302. The TXOUT+/− signal is then transmitted by the PA/LD 100 to VCSEL 302A of TOSA 300B. Of course, this operational scenario concerning the use of the combination of the TXRT, TXAMP and TXPOL signals is exemplary only and various other parameters of TXIN+/−, and combinations thereof, may be monitored and/or controlled as well.

Further, with respect to use of the TXPOL signal, data signal polarity adjustments made by the TX amplifier 112 with respect to TXIN+/− may be implemented in various ways. For example, in one embodiment of the invention, the polarity of the data signal is changed by electronically crossing-over the TXIN+ and TXIN− propagation paths, which causes the TXIN+ signal to propagate along the path along which the TXIN− signal would otherwise have propagated, and vice-versa. It should be noted that the foregoing polarization adjustment scheme is likewise germane to data signal polarity adjustments made by the RX amplifier 108 with respect to RXIN+/−. Moreover, such polarization adjustment schemes are exemplary only and are not intended to limit the scope of the invention in any way. Rather, any method and/or device suitable for modifying the polarity of a data signal may alternatively be employed.

With continuing attention to FIGS. 1 and 2, details are provided concerning exemplary operational aspects of the TOSA 300A. In the illustrated embodiment, the TOSA 300A receives the TXOUT+/− signal and the VCSEL 302A then transmits an optical signal (not shown) consistent with the received TXOUT+/−. In this way, the performance of VCSEL 302A can be adjusted and controlled in response to variables such as, but not limited to, temperature and voltage, so as to achieve transmission of an optical signal having certain desired properties or characteristics.

At substantially the same time as the VCSEL 302A transmits the optical signal, the photodiode 304A receives at least a portion of the optical signal transmitted by VCSEL 302A. Finally, the photodiode 304A generates and transmits the TXP signal to the digital IC controller 200, thereby indicating the optical power of the TOSA 300A. In this exemplary implementation, the TXP signal primarily serves to facilitate a monitoring functionality with respect to TOSA 300A performance. In addition to the TXP signal, the photodiode 304A also generates and transmits the TXI signal. As discussed in further detail below, the TXI signal is employed, in this exemplary embodiment, to facilitate control of TOSA 300A operations by way of power supply circuit 106.

In general, the power supply circuit 106 uses the TXI signal, in conjunction with the VREF signal, to vary, as necessary, the input current to the VCSEL 302A. As discussed earlier, the TXI is generated by the TOSA 300A and indicates the level of current at which the TOSA 300A is operating. On the other hand, the VREF signal represents a desired VCSEL 302A bias point. Typically, the value of the VREF signal, expressed as a signal reference voltage, is specified by digital IC controller 200 and transmitted to the PA/LD 100 as part of a control signal. The glue logic module 103 cooperates with DAC 104G to cause the generation and transmission of the VREF signal to the power supply circuit 106.

Thus, in the event that the feedback voltage from the TOSA 300A, indicated by or derived from the TXI signal, does not match the VREF signal reference voltage, then the power supply circuit 106 adjusts the LDI input to the TOSA 300A until a match is achieved. Thus, the power supply circuit 106 uses the feedback provided in the form of the TXI signal, in conjunction with the predetermined reference voltage provided in the form of the VREF signal, to determine and adjust, if necessary, the input power LDI to the VCSEL 302A and, thus, the optical power of the TOSA 300A. As noted earlier, the TXP signal may be employed in place of the TXI signal to provide similar control functionality with respect to TOSA 300A.

As an alternative to controlling various aspects of the TOSA 300A operations, it may be desirable in some instances to suspend the operation of TOSA 300A. To that end, the TXD signal is generated and transmitted by digital IC controller 200 to PA/LD 100 upon the satisfaction of certain conditions, and/or the occurrence of certain events, relating to the system. For example, the TXD signal would be generated and transmitted in the event of the occurrence of a predefined fault condition. In cases where the TXD signal has been generated and transmitted, the PA/LD 100 responds to the TXD signal by terminating transmission of the LDI signal to TOSA 300A, and thus data transmission by TOSA 300A, upon receipt of the TXD signal. Data transmission is then recommenced upon receipt, by the PA/LD 100, of an appropriate signal by way of the 'enable' pin of the digital control interface 102.

E. Aspects of Exemplary PA/LD Operations—RX and LOS Amplifiers & ROSA

It should be noted here that certain general aspects of an exemplary process 500 for using control devices such as amplifiers to implement actions concerning various optical devices, based upon one or more control signals received from a digital IC controller or other source, have already been discussed above in connection with FIG. 4. Accordingly, the following discussion will focus primarily on certain exemplary implementations of process 500 as they relate to the operation of the RX amplifier 108, the LOS circuit 110 and/or the ROSA 300B.

With respect first to the ROSA 300B, it was noted earlier that ROSA 300B converts an optical input signal, received at photodiode 302B, into the electrical signal RXIN+/− which is then received by the PA/LD 100. In general, the PA/LD 100 controls various aspects of the RXIN+/− signal, in accordance with a control signal received from the digital IC controller 200. The modified RXIN+/−signal is then transmitted by the PA/LD 100 to the customer as the RXOUT+/− signal.

Aspects of an exemplary process for performing various operations concerning the RXIN+/− signal generated by the ROSA 300B will now be considered in further detail. In particular, DACs 104A, 104B and 104I, respectively, convert the words, or portions thereof, of the control signal relating to the RXIN+/− transition time, RXIN+/− amplitude and RXIN+/− polarity, to an analog form and then transmit the analog signals RXRT, RXAMP and/or RXPOL, to RX amplifier 108. The RX amplifier 108 then adjusts, if necessary, the transition time, amplitude and/or polarity of RXIN+/− consistent with the received RXRT, RXAMP and/or RXPOL signals, respectively. The modified RXIN+/−, denoted as output signal RXOUT+/−, is then transmitted by the PA/LD 100 to the customer. It should be noted that the foregoing operational scenario concerning processes relating to the RXIN+/− signal is exemplary only and various other parameters of RXIN+/− may be monitored and/or controlled as well.

In addition to the RXIN+/− signal discussed above, ROSA 300B also generates the RXP signal which provides feedback to digital IC controller 200 concerning the optical power of photodiode 302B. In general, signals concerning ROSA 300B performance, and/or the performance of TOSA 300A, such as the RXP, TXP and TXI signals, may be generated and transmitted substantially continuously, or on any other desired basis.

In addition to controlling various parameters of RXIN+/−, some embodiments of PA/LD 100 are also configured to monitor, and report on, aspects of the status of RXIN+/−. In one exemplary embodiment, DACs 104C and 104D convert the hysteresis and threshold data, received from digital IC controller 200 as words or portions thereof, to an analog form and then transmit, respectively, the LOSHYST and LOSTH signals to the LOS circuit 110. The LOS circuit 110 then monitors RXIN+/− and transmits the LOS signal to the digital IC controller 200 when RXIN+/− exceeds, or falls below, a predefined threshold, and/or when no data is detected in the RXIN+/− signal.

Finally, the LOS circuit 110 also implements a hysteresis functionality to minimize or eliminate chatter on the LOS signal that may otherwise result as RXIN+/− moves back and forth over the predefined threshold. In particular, in the event that RXIN+/− moves below the predefined threshold, it must drop substantially below that threshold before the LOS signal will be generated and transmitted. The same is likewise true in the case where RXIN+/− moves above the predefined threshold. The upper and/or lower thresholds may be defined as necessary to suit the requirements of a particular application, In some embodiments of the invention, such loss of signal functionality may also be implemented with respect to the customer signal RXIN+/−.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. An integrated post-amplifier and laser driver assembly, comprising:
    a post-amplifier assembly configured to receive a digital input data signal from an optical receiver;
    a laser driver assembly implemented together with the post-amplifier assembly in a single IC and configured to transmit an output data signal; and
    a digital control interface in at least indirect communication with the post-amplifier assembly and the laser driver assembly, the digital control interface receiving a control signal that includes instructions and parameter values for the post-amplifier assembly and the laser driver assembly, wherein the post-amplifier assembly and the laser driver assembly each receive at least one of the instructions and parameter values through one or more digital to analog converters, and wherein the post-amplifier assembly comprises:
        a first amplifier configured to implement changes, in accordance with the control signal, to at least one of: the polarity of the input digital data signal received by the post-amplifier assembly from the optical receiver; the rise time of the input data signal received by the post-amplifier assembly from the optical receiver; and the amplitude of the input data signal received by the post-amplifier assembly from the optical receiver; and
        a second amplifier that includes hysteresis and threshold inputs and is configured to generate feedback concerning the input data signal received by the post-amplifier assembly from the optical receiver.

2. The integrated post-amplifier and laser driver assembly as recited in claim 1, wherein the laser driver assembly includes a power supply circuit configured for communication with an optical transmitter, and the power supply circuit being in at least indirect.

3. The integrated post-amplifier and laser driver assembly as recited in claim 2, wherein the power supply circuit includes a reference voltage input and an optical transmitter power level input.

4. The integrated post-amplifier and laser driver assembly as recited in claim 1, wherein the laser driver assembly is configured to modify at least one aspect of the output data signal received by the laser driver assembly.

5. The integrated post-amplifier and laser driver assembly as recited in claim 4, wherein the laser driver assembly is configured to modify at least one of: the polarity of the output data signal received by the laser driver assembly; the rise time of the data output signal received by the laser driver assembly; and the amplitude of the output data signal received by the laser driver assembly.

6. The integrated post-amplifier and laser driver assembly as recited in claim 1, further comprising:
    a glue logic module in communication with the digital control interface; and
    wherein the glue logic module is in communication with the one or more digital to analog converters, a first analog to digital converter of the one or more digital to analog converters in communication with the glue logic module and the post-amplifier assembly and a second digital to analog converter of the one or more digital to analog converters in communication with the glue logic module and the laser driver assembly.

7. The integrated post-amplifier and laser driver assembly as recited in claim 1, wherein the digital control interface comprises a serial digital interface.

8. The integrated post-amplifier and laser driver assembly as recited in claim 1, wherein the inputs to the integrated post-amplifier and laser driver assembly are digital inputs.

9. In a high-speed data communications system an integrated post-amplifier and laser driver assembly, comprising:
    a post-amplifier assembly configured to receive an input data signal from an optical receiver;
    a laser driver assembly implemented together with the post-amplifier assembly in a single IC and configured to transmit an output data signal to a transmit optical subassembly;
    a digital control interface in at least indirect communication with the post-amplifier assembly and the laser driver assembly, and configured to receive a control signal;
    a glue logic module in communication with the digital control interface;
    a first digital to analog converter in communication with the glue logic module and that transmits a first portion of the control signal to the post-amplifier assembly; and
    a second digital to analog converter in communication with the glue logic module and that transmits a second portion of the control signal to the laser driver assembly, the post-amplifier assembly comprising:
        a first amplifier configured to implement changes, in accordance with the control signal, to at least one of: the polarity of the input data signal received by the post-amplifier assembly from the optical receiver; the rise time of the input data signal received by the post-amplifier assembly from the optical receiver;

and the amplitude of the input data signal received by the post-amplifier assembly from the optical receiver; and a second amplifier that includes hysteresis and threshold inputs and is configured to generate feedback concerning the input data signal received by the post-amplifier assembly from the optical receiver.

10. The integrated post-amplifier and laser driver assembly as recited in claim 9, wherein the digital control interface comprises a serial digital interface.

11. The integrated post-amplifier and laser driver assembly as recited in claim 9, wherein the second amplifier is configured to generate a 'loss of signal' signal in the event the input data signal fails to comport with at least one predetermined condition.

12. The integrated post-amplifier and laser driver assembly as recited in claim 9, wherein the laser driver assembly includes a power supply circuit that includes a reference voltage input and an optical transmitter power level input, the power supply circuit being configured for communication with the laser, and the power supply circuit being in at least indirect communication with the digital control interface.

13. The integrated post-amplifier and laser driver assembly as recited in claim 9, wherein the laser driver assembly includes at least one amplifier that is configured to process, in accordance with the control signal, the output data signal received by the laser driver assembly.

14. The integrated post-amplifier and laser driver assembly as recited in claim 13, wherein the at least one amplifier is configured to implement changes, in accordance with the control signal, to at least one of: the polarity of the output data signal received by the laser driver assembly; the rise time of the output data signal received by the laser driver assembly; and the amplitude of the output data signal received by the laser driver assembly.

15. The integrated post-amplifier and laser driver assembly as recited in claim 9, wherein the post-amplifier assembly and the laser driver assembly are compatible with at least one of: the Gigabit Ethernet protocol; and the Fibre Channel protocol.

16. The integrated post-amplifier and laser driver assembly as recited in claim 9, wherein the digital control interface comprises:
a data pin adapted to receive a master-in-slave-out signal;
an enable pin adapted to receive master-out-slave-in signal; and
a third pin adapted to receive a system clock signal.

17. The integrated post-amplifier and laser driver assembly as recited in claim 9, wherein the glue logic module is configured to parse the control signal.

18. The integrated post-amplifier and laser driver assembly as recited in claim 9, wherein the glue logic module comprises at least first and second registers, the first register being in communication with the first digital to analog converter, and the second register being in communication with the second digital to analog converter.

19. An optical transceiver, comprising:
a receive optical subassembly, comprising:
an optical receiver configured to receive a digital optical data signal;
a transmit optical subassembly, comprising:
an optical transmitter; and
a monitor photodiode configured to monitor an optical output of the optical transmitter; and
an integrated post-amplifier and laser driver assembly, comprising:

a post-amplifier assembly in communication with the optical receiver;
a laser driver assembly implemented together with the post-amplifier in a single IC, the laser driver assembly being in communication with the transmit optical subassembly and configured to transmit an output data signal to the transmit optical subassembly; and
a digital control interface in communication with the post-amplifier assembly and the laser driver assembly, the digital control interface receiving a control signal that includes instructions and parameter values for the post-amplifier assembly and the laser driver assembly, wherein the post-amplifier assembly and the laser driver assembly each receive at least one of the instructions and parameter values through one or more digital to analog converters, and wherein the post-amplifier assembly comprises:
a first amplifier configured to implement changes, in accordance with the control signal, to at least one of: the polarity of the input data signal received by the post-amplifier assembly from the optical receiver; the rise time of the input data signal received by the post-amplifier assembly from the optical receiver; and the amplitude of the input data signal received by the post-amplifier assembly from the optical receiver; and
a second amplifier that includes hysteresis and threshold inputs and is configured to generate feedback concerning the input data signal received by the post-amplifier assembly from the optical receiver.

20. The optical transceiver as recited in claim 19, wherein the receive optical subassembly comprises:
a transimpedance amplifier; and
a photodiode in communication with the transimpedance amplifier.

21. The optical transceiver as recited in claim 19, wherein the transmit optical subassembly comprises:
a laser; and
a photodiode in communication with the laser.

22. The optical transceiver as recited in claim 21, wherein the laser comprises a VCSEL.

23. The optical transceiver as recited in claim 19, further comprising:
a glue logic module in communication with the digital control interface, wherein a first digital to analog converter of the one or more digital to analog converters is in communication with the glue logic module and the post-amplifier assembly and a second digital to analog converter of the one or more digital to analog converters is in communication with the glue logic module and the laser driver assembly.

24. The optical transceiver as recited in claim 19, wherein the laser driver assembly includes at least one amplifier configured to modify at least one aspect of the output data signal received by the laser driver assembly and transmitted to the optical transmitter, and the at least one amplifier being in communication with the optical transmitter.

25. The optical transceiver as recited in claim 19, wherein the laser driver assembly includes a power supply circuit in at least indirect communication with the digital control interface, and the power supply circuit being in communication with the optical transmitter.

26. The optical transceiver as recited in claim 19, wherein the optical transceiver is compatible with at least one of: the Gigabit Ethernet protocol; and the Fibre Channel protocol.

27. The optical transceiver as recited in claim 19, further comprising:
    a digital IC controller configured to:
        receive an electrical signal that corresponds to the optical power of the transmitter;
        receive an electrical signal that corresponds to the optical power in the optical receiver; and
        transmit a control signal to the laser driver assembly.

28. In a high-speed data communications system, an optical transceiver comprising:
    an optical receiver;
    an optical transmitter;
    an integrated post-amplifier and laser driver assembly, comprising:
        a post-amplifier assembly configured to receive an input data signal from the optical receiver, wherein the post-amplifier assembly comprises:
            a first amplifier configured to implement changes, in accordance with the control signal, to at least one of: the polarity of the input data signal received by the post-amplifier assembly from the optical receiver; the rise time of the input data signal received by the post-amplifier assembly from the optical receiver; and the amplitude of the input data signal received by the post-amplifier assembly from the optical receiver; and
            a second amplifier that includes hysteresis and threshold inputs and is configured to generate feedback concerning the input data signal received by the post-amplifier assembly from the optical receiver;
        a laser driver assembly implemented together with the post-amplifier assembly in a single IC and configured to transmit an output data signal to the optical transmitter;
        a serial digital interface in at least indirect communication with the post-amplifier assembly and the laser driver assembly, and configured to receive a control signal;
        a glue logic module in communication with the serial digital interface;
        a first digital to analog converter in communication with the glue logic module and that transmits a first portion of the control signal to the post-amplifier assembly; and
        a second digital to analog converter in communication with the glue logic module and that transmits a second portion of the control signal to the laser driver assembly.

29. The optical transceiver as recited in claim 28, wherein the second amplifier is configured to generate a 'loss of signal' signal in the event the input data signal received by the post-amplifier assembly from the optical receiver fails to comport with at least one predetermined condition.

\* \* \* \* \*

UNITED STATES PATENT AND TRADEMARK OFFICE
CERTIFICATE OF CORRECTION

| | |
|---|---|
| PATENT NO. | : 7,127,177 B1 |
| APPLICATION NO. | : 10/282605 |
| DATED | : October 24, 2006 |
| INVENTOR(S) | : Weber et al. |

It is certified that error appears in the above-identified patent and that said Letters Patent is hereby corrected as shown below:

Column 5
Line 28, after "In general", insert --,--

Column 9
Line 45, change "may" to --may be--

Column 12
Line 50, change "1041" to --104I--

Column 14
Line 5, after "indirect", insert --communication with the digital control interface--

Signed and Sealed this

Twenty-third Day of November, 2010

David J. Kappos
*Director of the United States Patent and Trademark Office*